W. M. FULTON.
FLEXIBLE TUBULAR CORRUGATED METAL WALL.
APPLICATION FILED MAY 19, 1913.
1,096,296.
Patented May 12, 1914.
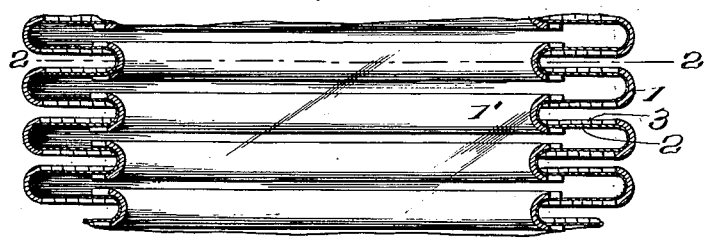
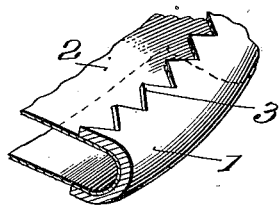
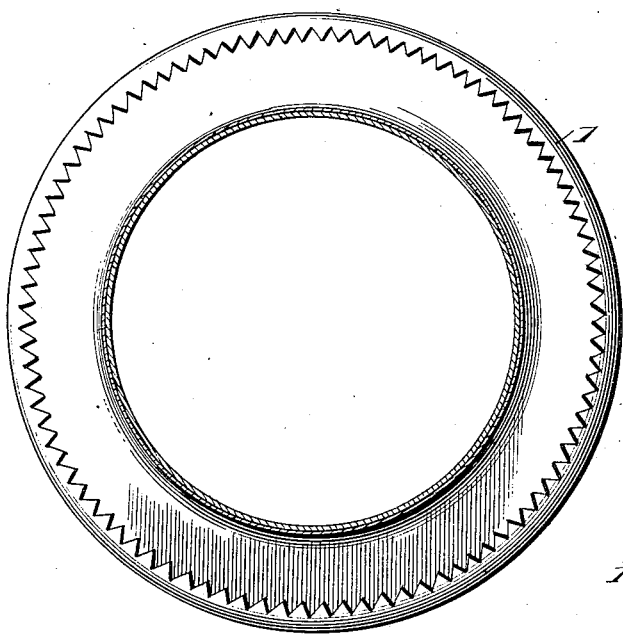
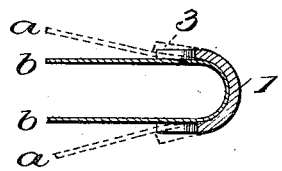
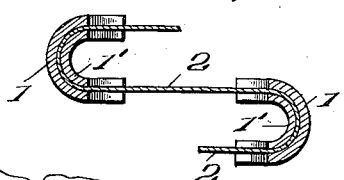
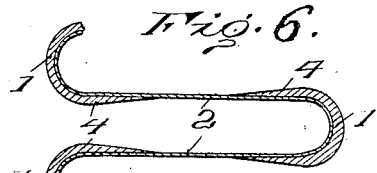
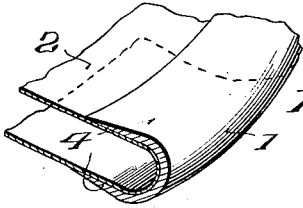
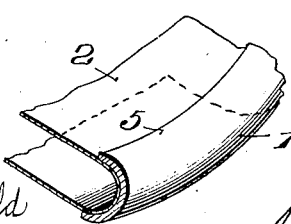
Witnesses:
E. E. Warfield
R. C. Fitzhugh
Inventor
Weston M. Fulton.
By Mauro, Cameron, Lewis & Massie
Attorneys

UNITED STATES PATENT OFFICE.

WESTON M. FULTON, OF KNOXVILLE, TENNESSEE, ASSIGNOR TO THE FULTON COMPANY, OF KNOXVILLE, TENNESSEE, A CORPORATION OF MAINE.

FLEXIBLE TUBULAR CORRUGATED METAL WALL.

1,096,296.   Specification of Letters Patent.   Patented May 12, 1914.

Application filed May 19, 1913. Serial No. 768,624.

*To all whom it may concern:*

Be it known that I, WESTON M. FULTON, of Knoxville, Tennessee, have invented a new and useful Improvement in Flexible Tubular Corrugated Metal Walls, which invention is fully set forth in the following specification.

This invention relates to flexible tubular corrugated metal walls for confining fluids. Vibratory tubular walls have heretofore been made in one of two general ways, either the wall has been built up of flat annular disks soldered or brazed to each other at their edges or a tube was provided with corrugations sufficiently deep to give to the wall the requisite flexibility. In the disk construction, flexibility was secured by making the width of the annular part quite wide. Whether the meeting edges of the disks were brazed flat together or bent into curved lapped joints, it was found that the joints did not stand up under the vibratory movements of the wall and cracked apart. The width of the disks introduced buckling difficulties resulting in lost motion in the extension and contraction of the wall and extra wear on the disks. In the corrugated construction circumferential joints have been avoided and flexibility secured at the bends as well as in the connecting portions between the bent portions of the wall. This construction has also enabled the narrowing of the connecting portions and thereby avoiding in large measure buckling difficulties in these portions. While these advantages have been secured by the introduction of the flexible corrugated wall, disadvantages have been introduced especially in those situations in which the flexible wall is used to contain an expansible fluid, the fluctuations of pressure of which on the walls causes the vibratory movement of the wall. In practice, the lateral pressure of such fluid on the wall perpendicular to the axis of the tubular wall becomes at times excessive and has resulted in the use of non-flexible braces which are applied in the form of rings on the concave side of the bends. Such practice is illustrated in U. S. Patent 823,382. For the same purpose the convex sides of the bends have received like braces which are recessed to receive the crests of the bends. While these devices overcome the outward pressure of the fluid in the vessel, no account has been taken in their use of their effect on the bending strains in the vicinity of the wall where they are located. The extension and contraction of a corrugated metal wall is accompanied by changes in the radius of curvature of the bends. The presence of rigid braces either on the concave or on the convex side of the bends localizes these bending strains along narrow lines where the wall bends at the brace. Their presence accentuates the wear at the bends in the wall and hastens deterioration at these concave and convex portions.

My invention relates to flexible tubular walls provided with corrugations and particularly to improvements in means for bracing the concave and convex portions against outwardly exerted fluid pressure while giving to the said curved portions a durability equal that of the lateral portions of the wall connecting the concave and convex portions, and my invention accomplishes the above objects by associating with those portions of the flexible corrugated wall constituting the bends, resilient members adapted to reinforce the bends against fluid pressure forcing them outward and to yieldingly restrain the flexure of the bends in their vibratory movement either in one direction or both directions with respect to their position of rest and thereby more equally distribute the working strains between the curved portions and lateral portions of the wall and increase the durability of the wall.

My invention is capable of mechanical expression in various forms some of which are illustrated in the accompanying drawings which are intended as illustrations to assist the description and not as defining the limits thereof.

In the drawings:—Figure 1 is a view in central vertical section showing a flexible corrugated wall provided with my improvement. Fig. 2 is a horizontal sectional view taken on line 2—2 of Fig. 1. Figs. 3 and 4 are detail views highly magnified. Figs. 5, 6, 7 and 8 are detail views highly magnified, showing portions of bends to which different forms of my improved brace are applied.

Referring to Figs. 1, 2, 3 and 4 of the drawings, a flexible tubular corrugated wall is therein shown, the bends of which are provided on their convex surfaces with braces 1 made of highly resilient material, such as thin sheet brass, steel or the like. In the drawings, the thickness of the metal comprising the walls and braces is somewhat enlarged for the sake of distinctness. In practice, very thin metal is used and seldom not more than one one-hundredth of an inch in thickness. These braces conform to the shape of the bends and preferably overlap the marginal surfaces of the portions 2 of the wall which connect the oppositely curved portions forming the bends of the corrugations. In the form of brace illustrated in Figs. 1-4, gradually increased flexibility is given the margins of the braces 1 by providing the margins where they extend over the connecting portions 2, with serrations 3. The resiliency of the braces 1 is thus graduated along their margins to the degrees of flexure of the bends where the latter merge into the lateral connecting portions 2 of the wall, thereby avoiding along these lines sharp lines of wear and more equally distributing the strains between the curved portions and the lateral connecting portions of the wall during its vibratory movements and also movements from side to side of its longitudinal axis. In Fig. 4, a fragment of the corrugated wall is shown while its bend is at the outward limit of an expansion $a$ of the vessel and while the bend is passing through its normal position of rest, $b$. In the position, $a$, of expansion, the curved portion of the wall and the brace member increase their radii of curvature and a slight slip takes place between the parts. The resilient margin or serration 3 reinforces the bend where it merges into the connecting portion 2 and transfers part of the bending strains heretofore sustained by the metal in the bend where no brace or where an inflexible brace has been used to the connecting portion. The work is thus more evenly divided between these two elements of the wall with evident advantages. During the contracting movement of the flexible wall the brace participates in the movement of the surface in contact with it and owing to the marginal resiliency of the brace continues in contact with the wall to the position of rest $b$, thereby hugging the wall in its movements and excluding dirt and moisture from between the surfaces.

In Figs. 6 and 7, a modified form of resilient brace is shown. Instead of serrating the margin, the margin is unbroken in outline and thinned down at 4 and vanishes to an edge. It will be apparent from what has been explained above in respect to the serrated form of brace that this form accomplishes the same results and in substantially the same manner.

In Fig. 8 is shown a flexible brace in all respects like the two forms previously described except that serrations and the thinned margin are omitted. While this form does not participate in all the advantages possessed by the other forms in the matter of flexibility, yet it embodies the idea of means for reinforcing the flexible bends of a corrugated metal wall with a resilient brace which is within the scope of my invention.

While I have so far described my improvement as applied to the convex surfaces of the bends in the flexible wall, I may apply the flexible brace in any of its forms to either side or to both the convex side and concave side. This construction is illustrated in Fig. 5 in which a serrated brace 1 is shown on the convex surface of the bend and a similar brace 1' is shown as placed against the concave surface. The principle of construction is the same for both forms.

The material of the braces is preferably the same as that of which the walls of the tube are made, yet it is to be understood that the wall and braces may be of different material.

It will be observed that all forms of my resilient brace secure protection of the circumferential curved portions of the wall against internal pressures while having the other advantages peculiar to their construction as above pointed out.

While I have described my invention as peculiarly applicable to tubular corrugated walls, I do not desire to limit my application to such walls since it is applicable to other forms of corrugated walls such as flat corrugated flexible walls and wherever the bends of flexible corrugations are subject to flexure back and forth.

What I claim is:—

1. In combination, a flexible corrugated wall and flexible braces located at the bends of said corrugations and adapted to equalize the strains at the bends with those in portions of the wall between said bends.

2. In combination, a flexible corrugated wall and resilient means associated with the bends in said wall for resisting their flexure.

3. In combination, a flexible wall composed of bent portions united by lateral portions and resilient means applied to said bends and said lateral portions.

4. In combination, a flexible corrugated wall and braces having flexible margins associated with the bends in said wall.

5. In combination, a flexible corrugated wall and braces having serrated resilient margins associated with the bends in said wall.

6. In combination, a flexible tubular wall provided with corrugations and braces engaging the bends of said corrugations and having serrated flexible margins extending beyond said bends.

7. In combination, a flexible tubular metal wall provided with corrugations and resilient braces associated with the convex surfaces of said corrugations restraining the flexure of said corrugations in one direction.

8. In combination, a flexible tubular metal wall provided with corrugations and braces engaging the bends of said corrugations and having flexible margins extending beyond the bends.

In testimony whereof I have signed this specification in the presence of two subscribing witnesses.

WESTON M. FULTON.

Witnesses:
C. H. BROWN, Jr.,
I. A. MARTIN.